United States Patent [19]

Kitami et al.

[11] Patent Number: 4,950,436
[45] Date of Patent: Aug. 21, 1990

[54] PROCESS FOR PRODUCING HOSES OF HIGH IMPERMEABILITY TO GAS AND VAPOR

[75] Inventors: Tetsu Kitami, Hadano; Jun Mito, Kanagawa; Tutomu Suyama, Nagoya, all of Japan

[73] Assignee: The Yokohama Rubber Co., Ltd., Japan

[21] Appl. No.: 340,658

[22] Filed: Apr. 20, 1989

[30] Foreign Application Priority Data

Apr. 25, 1988 [JP] Japan .................................. 63-100140

[51] Int. Cl.⁵ ........................................... B29C 35/06
[52] U.S. Cl. ............................. 264/103; 156/244.13; 264/166; 264/173; 264/236; 264/347
[58] Field of Search ............... 264/173, 166, 149, 150, 264/236, 347, 209.6, 103; 425/393, 403; 156/244.13

[56] References Cited

U.S. PATENT DOCUMENTS

| | | | |
|---|---|---|---|
| 3,255,284 | 6/1966 | Meislohn | 264/166 |
| 3,972,757 | 8/1976 | Derderian et al. | 264/347 |
| 3,988,189 | 10/1976 | Sullivan | 264/193 |
| 4,104,098 | 8/1978 | Hush et al. | 264/103 |
| 4,447,378 | 5/1984 | Gray et al. | 264/103 |
| 4,702,867 | 10/1987 | Sejimo et al. | 264/103 |

FOREIGN PATENT DOCUMENTS

| | | | |
|---|---|---|---|
| 0034294 | 8/1981 | European Pat. Off. | 264/173 |
| 1965670 | 7/1971 | Fed. Rep. of Germany | 264/150 |
| 3524286 | 9/1986 | Fed. Rep. of Germany | 264/347 |
| 62-59022 | 3/1987 | Japan | 264/209.6 |

Primary Examiner—Jeffery Thurlow
Attorney, Agent, or Firm—Finnegan, Henderson, Farabow, Garrett & Dunner

[57] ABSTRACT

A process is disclosed for producing a composite hose constructed with a core tube, a reinforcement layer and a cover laminated one on another, the core being made up of a resin inner wall and a rubber outer wall. Gas impermeability and flexibility are enhanced by formation of the inner wall on a mandrel of selected synthetic material and specified bending strength.

4 Claims, 1 Drawing Sheet

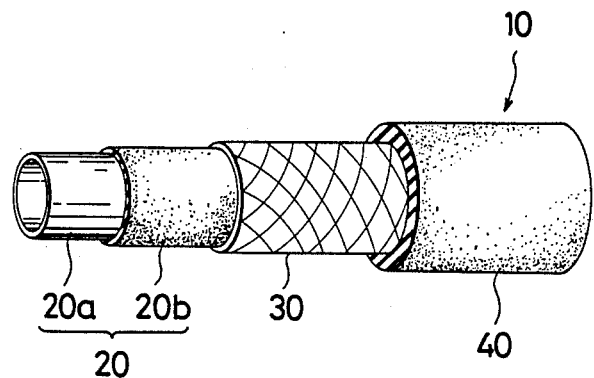

PROCESS FOR PRODUCING HOSES OF HIGH IMPERMEABILITY TO GAS AND VAPOR

BACKGROUND OF THE INVENTION

1. TECHNICAL FIELD

This invention is directed to a process for the production of hose constructions particularly suited for use in transporting or otherwise handling refrigerant and fuel fluids.

2. BACKGROUND ART

Hoses of the type mentioned above have been developed which are constructed with a core tube, a reinforcement layer and a cover superimposed in that order, the core tube being double-layered to improve impermeability to refrigerants and fuels. Such reinforced core is usually made up of a resinous inner wall and a rubbery outer wall.

As a barrier layer against leakage of the fluids involved, the inner wall of the core is required to be formed from a resinous material of sufficient permeation resistance to gas and vapor, adequate oil and chemical resistance and high heat stability. The wall thickness of this barrier is taken to be part of the requirements as it is closely associated with the magnitude of flexibility of the finished hose structure.

To impart increased flexibility to the hose, attempts have been made to dispose a resinous wall of reduced thickness over the internal surface of the core tube with the use of certain types of mandrels. Such known mode of processing, however, has proved restrictive with respect to the minimum possible thickness of the inner wall. This leaves the problem that a still smaller wall thickness will render the resulting core and hence the final hose readily susceptible to gas leakage and totally unsatisfactory for instance for Freon TM service.

DISCLOSURE OF THE INVENTION

With the foregoing difficulties of the prior art in view, the present invention seeks to provide as improved process for producing composite hoses which will exhibit high impermeability to gas and to vapor and great flexibility, thus ensuring efficient delivery of refrigerants and fuels. The process of the invention essentially comprises the use of mandrels of selected synthetic materials and specified physical properties so that it enables an innermost resinous wall of the hose to reduce in thickness without marring, facilitating workability and productivity.

More specifically, the invention provides a process for producing a hose construction comprising a core tube having a resinous inner wall and a rubbery outer wall, a reinforcement layer disposed around the outer wall, and a cover laminated over the reinforcement layer, which process comprises forming the inner wall by extrusion on a mandrel to a small thickness, the mandrel resulting from an unplasticized or plasticized polymeric or elastomeric material and having a bending strength of 0.2 to 3 kgf, and the plasticized material containing a plasticizer in an amount of not more than 10% by weight, whereby the hose has high impermeability to gas and to vapor and great flexibility.

BRIEF DESCRIPTION OF THE DRAWING

The accompanying drawing is a segmental perspective view, partly cut away, of a refrigerant hose provided in accordance with the present invention.

BEST MODE OF THE INVENTION

A hose 10 is comprised of a core tube 20, as seen from the drawing, of a two-layered structure having an inner wall 20a and an outer wall 20b. The inner wall, disposed for direct contact with a fluid such as a refrigerant or a fuel, is formed from a selected class of resins, whereas the outer wall is formed from a selected class of rubbers.

By suitable choice, there may be used as inner wall resins polyamides such as nylon-6, nylon-11, nylon-12, nylon-6,66 copolymers and the like and polyamide-polyolefin blends, all such resins being preferred to provide a good balance between impermeability and flexibility. The blend may be composed for example of 40 to 80 parts by weight of nylon-6 or nylon-6,66, 5 to 30 parts by weight of nylon-11 and 10 to 40 parts by weight of a polyolefin. Olefin polymers may be selected from polyethylenes, polypropylenes and the like and also from ethylene-propylene copolymers and the like. Outer wall rubbers typically include nitrile-butadiene rubber (NBR), chlorosulfonated polyethylene rubber (CSM), ethylene-propylene-diene rubber (EPDM), butyl rubber (IIR), chlorinated butyl rubber (Cl-IIR), brominated butyl rubber (Br-IIR), epichlorohydrine rubber (CHR, CHC), acrylic rubber (ACM), chloroprene rubber (CR) and the like.

The inner wall may have a relatively small thickness of not more than 800 $\mu$m, preferably 50 to 800 $\mu$m. The outer wall ranges in thickness from about 0.5 to 3 mm.

Wrapped around the outer wall is a layer of reinforcement 30 over which a cover 40 is laminated. The reinforcement may be placed for instance by braiding a textile yarn such as of rayon, polyester or the like commonly accepted in the industry. The cover material may conveniently be chosen for example from EPDM, CR, CSM, CHR, CHC, IIR, Cl-IIR, Br-IIR and the like. Such rubbers are similar in class to, but should be higher in modulus than, those employed in the core outer wall. The thickness of the cover is in the range of about 0.5 to 3 mm.

The hose obtainable by the invention is highly resistant to gas leakage despite its innermost wall being relatively small in thickness, and sufficiently flexible.

According to the invention, there is provided a process for producing the above hose construction by the use of a mandrel of a selected synthetic material and specified physical properties. Importantly, the mandrel should be formed from a polymeric or elastomeric material which may be unplasticized or plasticized such that it has a plasticizer content up to 10% by weight and a bending strength of 0.2 to 3 kgf, preferably 0.5 to 1.8 kgf, in terms of the ability to bend to a radius of 150 mm at an outside diameter of 11 mm.

Such a mandrel of synthetic material tends to get more flexible, the higher the degree of plasticization in the material. Lesser plasticizer results in a mandrel of higher bending strength, i.e. lower flexibility. Greater plasticization degrees than 10% by weight would invite objectionable plasticizer migration into an inner wall resin of the core tube at the hose curing stage, resulting in an inner wall of low resistance to gas permeation. Higher bending strengths than 3 kgf would induce marred inner wall during removal of the mandrel from the hose composite cured. The mandrel if lower bending strengths than 0.2 kgf would become scarred upon pulling out at the hose finishing stage.

To apply the inner wall to a smaller thickness with impermeability held at a high level, the mandrel should necessarily have lesser or nil plasticizer contained. In such instance, the mandrel may originate from a polymer or elastomer made flexible by nature, thereby maintaining its bending strength within the above specified range.

No particular restriction is imposed on the polymer and elastomer used for mandrel formation. Typical examples of polymers include nylon-6, nylon-11, nylon-12, nylon-6,66 copolymers, polyamide-polyether copolymers, 4-methylpentene-1 resin and the like. Eligible elastomers comprise ethylene-propylene-diene rubber (EPDM), isoprene-isobytylene rubber (IIR) and the like.

Plasticizers used herein are not specifically limited but may suitably be selected for the polymeric mandrel from phthalic esters, glycol esters, phosphoric esters, trimellitic esters, aliphatic esters, aliphatic dibasic esters, toluenesulfonamides, alkylbenzene sulfonamides, epoxy plasticizers and the like. Preferred are toluenesulfonamides and alkylbenzene sulfonamides for polyamides and polyamide-polyether copolymers, and olefinic oligomers for 4-methylpentene-1 resin. Paraffinic or naphthenic softeners are conveniently used for the elastomeric mandrel particularly of EPDM.

A preferred embodiment of the process according to the invention will now be described.

A release-treated mandrel is passed through an extruder equipped with a head from which a given resin is extruded around the mandrel, whereby an inner tubular layer of resinous material is formed. The inner layer-carrying mandrel is then allowed to enter a rubber extruder at which time an outer layer of a selected rubber is laminated over the resinous layer. A core tube is thus provided.

Suitable adhesives may be applied, where desired, onto and inbetween the inner and outer layers to thereby render the resulting hose mechanically strong and durable.

A reinforcement is braided over the outer layer of the core tube. A cover is disposed peripherally around the braid by extrusion of a given rubber.

The hose composite thus constructed is lead-covered or cloth-wrapped and then vulcanized under pressure at 130° to 170° C., preferably 140° to 160° C. On completion of cooling, the mandrel is pulled out of the vulcanizate, after which a desired hose product is obtained.

EXAMPLES

The following examples are given to further illustrate the present invention but should not be regarded as limiting the invention.

Inventive Examples 1 to 13 and Comparative

EXAMPLES 1 to 8

Different mandrels were prepared, as per tabulated, with varying materials, plasticizer contents and bending strengths. As the materials were used N-6 (nylon-6, CM-1041, Toray Industries, Inc.), N-11 (nylon-11, RIL-SAN BESNO P40TL, Atochem), 4-MePN (4-methylpentene-1 resin, TPX MX004, Mitsui Petrochemical Co.), polyamide-polyether copolymer (Atochem, PEBA) and EPDM (ethylene-propylene-diene rubber).

The test mandrels were employed to construct different hoses with core inner walls of varying thicknesses. The inner wall was formed from a nylon-6 to nylon-11 to polyolefin blend of a weight ratio of 59.6 to 27.5 to 14.9. The outer wall of the core was made from butyl rubber and the cover from chloroprene rubber. Rayon braiding was used as the layer of reinforcement.

Performance evaluation was made of the mandrels and hoses under the conditions given below and with the results shown also in the table.

Bending Strength (Flexibility) of Mandrel

A test mandrel was bent arcuately to a radius of 150 mm. The resulting bending strength was converted from its sectional area to the one corresponding to an outside diameter of 11 mm.

Refrigerant Permeation of Hose

JRA 2001 (Japanese Refrigerating and Air Conditioning Standard) was followed. Into a coupler-fitted hose of 0.45 m in length was charged a refrigerant (Freon R-12) in an amount of $0.6 \pm 0.1$ g/cm3, and the hose was left to stand at 100° C. for 96 hours. Weight loss, i.e. gas permeation, was measured between 24th and 96th hours and converted to a unit of gf/m/72 hours at 100° C.

Gas Leakage of Hose

A set of ten test hoses each assembled with metal couplers at both ends was aged in hot air at 120° C. for 240 hours, followed by charging of nitrogen gas at 30 kgf/cm$^2$. Each hose after being maintained for 5 minutes was examined for gas escape from the hose portions to which the couplers were attached. This quality was adjudged by the number of unleaked hoses in each set.

As appears clear from the test data, the polymeric mandrels departing in plasticizer content from the specified range, Comparative Examples 1 to 6, produced inner walls of greater refrigerant leaks with thinner walls. An elastomeric mandrel, Comparative Example 8, failed to improve gas impermeation.

Inventive Examples 1 to 4 show increased gas permeation with reduced wall thickness, but the magnitude of leakage has proved negligibly small contrasted to the runs in the above comparative examples. Similar observations apply to the runs using plasticizer-free, polymeric and elastomeric mandrels in Inventive Examples 5 to 8 and 10 to 13.

Even with nil plasticizer, a polymeric mandrel not meeting the specified range of bending strength revealed marred wall at the hose finishing stage as evidenced by Comparative Example 7 in which nitrogen gas leaks took place in four hoses out of ten.

TABLE

| | Comparative Examples | | | | | | | | Inventive Examples | | | | | | | | |
|---|---|---|---|---|---|---|---|---|---|---|---|---|---|---|---|---|---|
| | 1 | 2 | 3 | 4 | 5 | 6 | 7 | 8 | 1 | 2 | 3 | 4 | 5 | 6 | 7 | 8 | 9 |
| resinous inner wall thickness (mm) | 0.80 | 0.50 | 0.35 | 0.20 | 0.15 | 0.10 | 0.15 | 0.15 | 0.80 | 0.50 | 0.35 | 0.15 | 0.50 | 0.35 | 0.20 | 0.10 | 0.15 |
| mandrel material | N-11 | N-11 | N-11 | N-11 | N-11 | N-11 | N-6 | EPDM | N-11 | N-11 | N-11 | N-11 | N-11 | N-11 | N-11 | N-11 | N-6 |
| plasticizer content (%) | 14 | 14 | 14 | 14 | 14 | 14 | 0 | 13 | 8 | 8 | 8 | 8 | 0 | 0 | 0 | 0 | 8 |
| bending | 1.3 | 1.3 | 1.3 | 1.3 | 1.3 | 1.3 | 3.3 | 0.37 | 1.6 | 1.6 | 1.6 | 1.6 | 1.9 | 1.9 | 1.9 | 1.9 | 1.9 |

TABLE-continued

| strength(kgf) | | | | | | | | | | | | | | | | |
|---|---|---|---|---|---|---|---|---|---|---|---|---|---|---|---|---|
| Freon permeation (gf/m/72 hr at 100° C.) | 0.02 | 1.80 | 3.10 | 5.90 | 8.50 | 11.50 | 2.95 | 8.70 | 0.02 | 1.50 | 2.50 | 3.80 | 1.25 | 1.90 | 2.65 | 2.90 | 3.75 |
| N₂ leakage | o (10) | o (10) | o (10) | o (10) | o (10) | o (10) | x (6) | o (10) | o (10) | o (10) | o (10) | o (10) | o (10) | o (10) | o (10) | o (10) | o (10) |

| | Inventive Examples | | | |
|---|---|---|---|---|
| | 10 | 11 | 12 | 13 |
| resinous inner wall thickness (mm) | 0.15 | 0.35 | 0.15 | 0.15 |
| mandrel material | 4-MePN | PEBA | PEBA | EPDM |
| plasticizer content (%) | 0 | 0 | 0 | 0 |
| bending strength(kgf) | 1.5 | 1.45 | 1.45 | 0.50 |
| Freon permeation (gf/m/72 hr at 100° C.) | 2.80 | 1.95 | 2.90 | 2.95 |
| N₂ leakage | o (10) | o (10) | o (10) | o (10) |

N₂ leakage: o - not leaked  x - leaked

What is claimed is:

1. A process for the production of a hose construction comprising a core tube having a resinous inner wall and a rubbery outer wall, a reinforcement layer disposed around said outer wall, and a cover laminated over said reinforcement layer, which process comprises extruding a resin around a mandrel to form a tubular layer and provide said inner wall having a thickness of not more than 800 μm, said mandrel being formed of an unplasticized or plasticized polymeric or elastomeric material and having a bending strength of 0.2 to 3 kgf, and said plasticized material containing a plasticizer in an amount of not more than 10% by weight, laminating said outer wall over said inner wall, forming said reinforcement layer over said outer wall, and forming said cover of a rubbery material around said reinforcement layers, whereby the hose has high impermeability to gas and to vapor and great flexibility.

2. The process of claim 1 wherein said mandrel is formed of one member selected from the group consisting of nylon-6, nylon-11, nylon-12, nylon-6,66 copolymer, polyamide-polyether copolymer and 4-methylpentene-1 resin.

3. The process of claim 1 wherein said mandrel is formed of one member selected from the group consisting of ethylene-propylene-diene rubber and isoprene-isobutylene rubber.

4. The process of claim 1 wherein said plasticizer is one member selected from the group consisting of phthalic esters, glycol esters, phosphoric esters, trimellitic esters, aliphatic esters, aliphatic dibasic esters, toluenesulfonamides, alkylbenzene sulfonamides, epoxy plasticizers, paraffinic softeners, naphthenic softeners and olefinic oligomers.

* * * * *